United States Patent
Cavalieri et al.

(10) Patent No.: US 10,160,849 B1
(45) Date of Patent: Dec. 25, 2018

(54) PROPYLENE-BASED COPOLYMER COMPOSITION FOR PIPES

(71) Applicant: BASELL POLIOLEFINE ITALIA S.R.L., Milan (IT)

(72) Inventors: Claudio Cavalieri, Ferrara (IT); Monica Galvan, Ferrara (IT); Giampaolo Pellegatti, Ferrara (IT); Francesca Tisi, Ferrara (IT)

(73) Assignee: Basell Poliolefine Italia S.r.l., Milan (IT)

(*) Notice: Subject to any disclaimer, the term of this patent is extended or adjusted under 35 U.S.C. 154(b) by 0 days.

(21) Appl. No.: 15/514,797

(22) PCT Filed: Sep. 9, 2015

(86) PCT No.: PCT/EP2015/070529
§ 371 (c)(1),
(2) Date: Jul. 9, 2018

(87) PCT Pub. No.: WO2016/050461
PCT Pub. Date: Apr. 7, 2016

(30) Foreign Application Priority Data

Oct. 1, 2014 (EP) .................. 14187259

(51) Int. Cl.
*C08L 23/12* (2006.01)
*F16L 9/127* (2006.01)

(52) U.S. Cl.
CPC ............ *C08L 23/12* (2013.01); *F16L 9/127* (2013.01); *C08L 2203/18* (2013.01); *C08L 2205/025* (2013.01); *C08L 2205/03* (2013.01); *C08L 2207/02* (2013.01)

(58) Field of Classification Search
CPC ............ C08L 23/12; C08L 2205/025; C08L 2205/03; C08L 2203/18; C08L 2207/02; F16L 9/127
See application file for complete search history.

(56) References Cited

U.S. PATENT DOCUMENTS

| | | |
|---|---|---|
| 6,503,993 B1 | 1/2003 | Huovinen et al. |
| 6,875,826 B1 | 4/2005 | Huovinen et al. |
| 2005/0159564 A1 | 7/2005 | Huovinen et al. |
| 2007/0281445 A1 | 12/2007 | Nguyen et al. |
| 2008/0167428 A1* | 7/2008 | Massari et al. .......... C08L 23/12 525/240 |
| 2009/0283935 A1* | 11/2009 | Massari et al. ....... C08F 210/06 264/328.2 |
| 2011/0151161 A1 | 6/2011 | Malm et al. |

FOREIGN PATENT DOCUMENTS

| | | |
|---|---|---|
| EP | 2505606 A1 | 10/2012 |
| JP | 2004196959 A | 7/2004 |
| JP | 2013234318 A | 11/2013 |
| WO | WO-2005014713 A1 | 2/2005 |
| WO | WO-2011160953 A1 | 12/2011 |

OTHER PUBLICATIONS

PCT International Search and Written Opinion dated Dec. 15, 2015 (Dec. 15, 2015) for Corresponding PCT/EP2015/070529.

* cited by examiner

Primary Examiner — Nathan M Nutter

(57) ABSTRACT

The present disclosure relates to a polyolefin composition comprising, in some embodiments:
A) 90.0-99.0 wt % of a propylene homopolymer;
B) f1.0-10.0 wt % of a propylene/ethylene copolymer composition comprising:
b1) 14-52 wt % of a propylene homopolymer or a propylene/ethylene copolymer;
b2) 48-86 wt % of a propylene ethylene copolymer comprising an ethylene derived units content of 20.0-55.0 wt %;
wherein the resulting polyolefin composition has a melt flow rate (MFR; ISO 1133, 230° C., 5 kg) of 0.2-4.0 g/10 min; the sum of A+B equals 100% by weight and the sum of b1+b2 equals 100% by weight.

8 Claims, No Drawings

PROPYLENE-BASED COPOLYMER COMPOSITION FOR PIPES

FIELD OF THE INVENTION

The present disclosure relates to a composition comprising a propylene homopolymer and a heterophasic propylene ethylene copolymer for the production of pipes such as sewage pipes especially for use at low temperature.

BACKGROUND OF THE INVENTION

Propylene ethylene copolymers may be used in the production of pipes.

For example, WIPO Pat. App. Pub. No. WO 97/33117, describes pipes comprising polypropylene plastic material having high creep resistance, high long-term pressure resistance, improved stiffness and resistance to rapid crack propagation. As described therein, catastrophic failure of a polypropylene plastic pipe is prevented when the pipe is made of several layers of different polypropylene plastic material, where at least one layer consists of a broad molecular weight distribution (MWD) polypropylene that provides the high creep resistance and at least one layer consists of an elastomer-modified polypropylene that improves the impact strength. The broad MWD polypropylene is a mixture of a very high molecular weight propylene random copolymer with 1-10 wt % of ethylene or higher alpha-olefin repeating units and a low molecular weight propylene polymer with a low (up to 1 wt %) or zero comonomer content.

When small diameter pipes are needed, it may be important to have limited pipe wall thickness, which allows for pipes containing less material and improved efficiency in terms of feed due to the higher internal diameter. However, when the wall thickness becomes smaller the pipe may become brittle, thus it is necessary to use a material having high impact resistance, especially at low temperature. Furthermore, the pipe material may require a high flexural modulus in order to obtain rigid pipes. In a polypropylene based composition, the Izod may be improved while the flexural modulus is lowered. As described herein, a small amount of heterophasic copolymers having certain features can be added to a propylene ethylene copolymer for improving impact/stiffness balance without compromising stiffness.

SUMMARY OF THE INVENTION

The present disclosure relates to a polyolefin composition comprising:

A) 90.0-99.0 wt % of a propylene homopolymer comprising:
  (i) a polydispersity index (PI) of 5 to 10;
  (ii) a xylene solubles fraction at 25° C. of 1.0-4.0 wt %; and
  (iii) a melt flow rate (MFR; ISO 1133; 230° C., 5 kg) of 0.2-3.5 g/10 min;

B) 1.0-10.0 wt % of a propylene/ethylene copolymer composition comprising:
  b1) 14-52 wt % of a propylene homopolymer or a propylene/ethylene copolymer having a content of ethylene derived units of 0.1-4.5 wt %; having a xylene soluble content measured at 25° C. lower than 10 wt %; and a melt flow rate (ISO 1133; 230° C., 2.16 kg) of 50-120 g/10 min;
  b2) 48 86 wt % of a propylene ethylene copolymer having a content of ethylene derived units of 20.0-55.0 wt %;

wherein the resulting polyolefin composition has a melt flow rate (ISO 1133; 230° C./5 kg) of 0.2-4.0 g/10 min; where the sum of A+B equals 100% by weight and the sum of b1+b2 equals 100% by weight.

DETAILED DESCRIPTION OF THE INVENTION

In some embodiments, the present disclosure relates to a polyolefin composition comprising:

A) 90.0-99.0 wt %; such as 93.0-98.5 wt % 95.0-98.5 wt % of a propylene homopolymer comprising:
  (i) a polydispersity index of 5-10
  (ii) a xylene solubles content at 25° C. of 1.0-4.0 wt %; including 2.0-3.0 wt %;
  (iii) a melt flow rate (MFR; ISO 1133; 230° C., 5 kg) of 0.2-3.5 g/10 min; such as 0.6-2.0 g/10 min;

B) 1.0-10.0 wt %; including 1.5-7.0 wt %; and 1.5-5.0. wt % of a propylene/ethylene copolymer composition comprising:
  b1) 14-52 wt %; including 18-44 wt %; and 22-38 wt % of a propylene homopolymer or a propylene/ethylene copolymer having a content of ethylene derived units of 0.1-4.5 wt %; having a xylene soluble content measured at 25° C. of lower than 10 wt %; such as lower than 8 wt %; and lower than 7 wt %; and a melt flow rate (MFR; ISO 1133; 230° C./2.16 kg) of 50-120 g/10 min; including 72-115 g/10 min; and 80-95 g/10 min;
  b2) 48-86 wt %, including 56-82 wt %; and 62-78 wt % of a propylene ethylene copolymer having a content of ethylene derived units of 20.0-55.0 wt %; such as 28-45 wt %; and 32-40 wt %;

wherein the resulting polyolefin composition has an melt flow rate (MFR; ISO 1133; 230° C., 5 kg) of 0.2-4.0 g/10 min; including 0.4-3.0 g/10 min; 0.5-2 g/10 min; and the sum of A+B equals 100% by weight and the sum of b1+b2 equals 100% by weight.

As used herein, the term "copolymer" refers to a polymer comprising only two monomers, such as propylene and ethylene.

In some embodiments, component b1) comprises a propylene homopolymer.

In further embodiments, component b2) comprises a propylene/ethylene copolymer comprising an intrinsic viscosity of the xylene soluble fraction at 25° C. ranging of 1.5-3.9 dl/g; including 2.2-3.2 dl/g.

In some embodiments, the polyolefin composition of the present disclosure is used to produce pipes such as sewage pipes having high modulus and high impact resistance values.

The term "pipe," as used herein, also includes pipe fittings, valves and all related components and parts necessary for a water piping system, and include single and multilayer pipes, where one or more of the pipe layers may be, e.g. a metal layer and an adhesive layer.

Such articles can be manufactured through a variety of industrial processes known to the skilled artisan, such as molding, extrusion, etc.

In a further embodiment of the present disclosure, the composition of the present disclosure further comprises an inorganic filler agent in an amount ranging from 0.5-60 parts by weight with respect to a 100 parts by weight composition. Examples of inorganic filler agents for use in the present technology include calcium carbonate, barium sulfate, titanium bioxide and talc. A number of inorganic filler agents such as talc can, in some embodiments, have a nucleating effect. In further embodiments, the amount of a nucleating agent incorporated into the polymer is 0.2-5 wt %.

In certain embodiments, the composition of the present disclosure is used for producing pipes with walls of any configuration other than those with smooth inner and outer surface, including pipes with a sandwich-like pipe wall, pipes with a hollow wall construction with longitudinally extending cavities, pipes with a hollow wall construction with spiral cavities, pipes with a smooth inner surface and a compact or hollow, spirally shaped, or an annularly ribbed outer surface that is independent of the configuration of the respective pipe ends.

Articles, pressure pipes and related fittings according to the present disclosure are produced using, e.g. (co-)extrusion or molding.

The extrusion of articles in accordance with the present disclosure can be made with different type of extruders for polyolefins, e.g. single- or twin-screw extruders.

A further embodiment of the present disclosure is a process wherein the polymeric composition is molded into articles described herein, including pipes.

When the pipes are multi-layered, at least one layer is made of the polyolefin composition described herein. In some embodiments, the additional layer(s) may comprise an amorphous or crystalline polymer (such as a homopolymer and/or co- or terpolymer) of R—CH=CH$_2$ olefins, where R is a hydrogen atom or a C$_1$-C$_6$ alkyl radical. In some embodiments, the polymers are selected from:

isotactic or mainly isotactic propylene homopolymers;

random co- and terpolymers of propylene with ethylene and/or C$_4$-C$_8$ α-olefins, such as 1-butene, 1-hexene, 1-octene, and 4-methyl-1-pentene, wherein the total comonomer content ranges from 0.05-20% by weight, or a mixture of polymers with isotactic or mainly isotactic propylene homopolymers;

heterophasic polymer blends comprising (a) a propylene homopolymer and/or one of the co- and terpolymers listed above, and an elastomeric moiety (b) comprising co- and terpolymers of ethylene with propylene and/or a C$_4$-C$_8$ α-olefin, optionally containing minor amounts of a diene; and amorphous polymers such as fluorinated polymers and polyvinyl difluoride (PVDF).

In some embodiments, multi-layer pipes comprising the compositions of the present disclosure may comprise pipe layers having the same or different thicknesses.

In further embodiments, the composition of the present disclosure can be prepared by blending the various components A), b1) and b2), or by preparing component A) and blending this component with component B) as prepared in a single polymerization process by sequential polymerization steps.

The polymerization of A) and B) can be carried out in the presence of Ziegler-Natta (Z-N) catalysts. A primary component of Z-N catalysts comprises a titanium compound having at least one titanium-halogen bond and an electron-donor compound, both of which are supported on a magnesium halide in active form. Another component (co-catalyst) often found in Z-N catalyst is an organoaluminum compound, such as an aluminum alkyl compound.

In some embodiments, the Z-N catalyst may comprise an external electron donor.

In some embodiments, the catalysts of the present disclosure are capable of producing polypropylene with a value of xylene insolubility at ambient temperature greater than about 90%, including greater than about 95%.

Catalysts having the above mentioned characteristics are described in U.S. Pat. Nos. 4,399,054 and 4,472,524 and European Pat. No. EP45977.

In some embodiments, the solid catalyst components used in the catalysts described herein comprise, as electron-donors (internal donors), compounds selected from the group consisting of ethers, ketones, lactones, compounds containing N, P and/or S atoms, and esters of mono- and dicarboxylic acids.

In some embodiments, the electron-donor compounds are esters of phthalic acid and 1,3-diethers of the general formula:

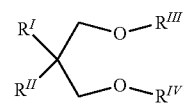

wherein $R^I$ and $R^{II}$ are the same or different and are C$_1$-C$_{18}$ alkyl, C$_3$-C$_{18}$ cycloalkyl or C$_7$-C$_{18}$ aryl radicals; $R^{III}$ and $R^{IV}$ are the same or different and are C$_1$-C$_4$ alkyl radicals; or are 1,3-diethers in which the carbon atom in position 2 belongs to a cyclic or polycyclic structure made up of 5, 6, or 7 carbon atoms, or of 5-n or 6-n' carbon atoms, and "n" nitrogen atoms and "n'" heteroatoms, respectively, are selected from the group consisting of N, O, S and Si, where n is 1 or 2 and n' is 1, 2, or 3, where the structure comprises two or three sites of unsaturation (cyclopolyenic structure), and is optionally condensed with other cyclic structures, or substituted with one or more substituents selected from the group consisting of linear or branched alkyl radicals; cycloalkyl, aryl, aralkyl, alkaryl radicals and halogens, or is condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in European Pat. Apps. EP361493 and EP728769.

In some embodiments, the diethers are selected from 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane and 9,9-bis (methoxymethyl) fluorene.

Other electron-donor compounds that may be used include phthalic acid esters, such as diisobutyl, dioctyl, diphenyl and benzylbutyl phthalate.

The preparation of the above described catalyst component may be carried out according to various methods known to the skilled artisan.

For example, a MgCl$_2$.nROH adduct (e.g., in the form of spheroidal particles) wherein n is generally from 1 to 3 and ROH is ethanol, butanol or isobutanol, is reacted with an excess of TiCl$_4$ comprising an electron-donor compound. The reaction temperature is generally from about 80-120° C. The solid is then isolated and reacted once more with TiCl$_4$, in the presence or absence of the electron-donor compound, after which it is separated and washed with aliquots of a hydrocarbon until all chloride ions (Cl$^-$) have disappeared.

In the solid catalyst component the titanium compound (Ti) may be generally present in an amount from about 0.5-10% by weight. In certain embodiments, the quantity of electron-donor compound which remains fixed on the solid catalyst component is about 5-20% by moles with respect to the magnesium dihalide.

The titanium compounds, which can be used for the preparation of the solid catalyst component, are the halides and the halogen alcoholates of titanium such as titanium tetrachloride ($TiCl_4$).

The reactions described above result in the formation of a magnesium halide in active form. Other reactions known in the literature that may produce magnesium halide in an active form starting from magnesium compounds other than halides, such as magnesium carboxylates.

In some embodiments, the Al-alkyl compounds used as co-catalysts may comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

In certain embodiments, the Al-alkyl compound may be used in such a quantity that the Al/Ti ratio is about 1-1000.

In additional embodiments, the electron-donor compounds that can be used as external donors include aromatic acid esters such as alkyl benzoates and silicon compounds containing at least one Si—OR bond, where R is a hydrocarbon radical.

Examples of silicon compounds for use in the present technology are (tert-butyl)$_2$Si(OCH$_3$)$_2$, (cyclohexyl)(methyl)Si(OCH$_3$)$_2$, (cyclopentyl)$_2$Si(OCH$_3$)$_2$ and (phenyl)$_2$Si(OCH$_3$)$_2$ and (1,1,2-trimethylpropyl)Si(OCH$_3$)$_3$.

In some embodiments, 1,3-diethers having the formulae described above can also be used advantageously. If the internal donor is one of these diethers, the external donors can be omitted.

In certain embodiments, the components A) and B) may be prepared by using catalysts containing a phthalate as an internal donor and (cyclopentyl)$_2$Si(OCH$_3$)$_2$ as an external donor, or 1,3-diethers may be used as internal donors.

In some embodiments, Ziegler-Natta catalysts that can be used to produce a propylene polymer of the present disclosure include solid catalyst components comprising a magnesium halide, a titanium compound having at least a Ti-halogen bond and at least two electron donor compounds, the first selected from succinates and the second selected from 1,3 diethers.

Component A) may be produced using a polymerization process as described in European Pat. App. EP1 012 195.

This process comprises feeding the monomers to the polymerization zones in the presence of catalyst under reaction conditions and collecting the polymer product from the polymerization zones. The growing polymer particles flow upward through one (first) of the polymerization zones (the riser) under fast fluidization conditions, leave the riser and enter another (second) polymerisation zone (the downcomer) through which they flow downward in a densified form under the action of gravity. The polymer particles then leave the downcomer and are reintroduced into the riser, thus establishing a "circulation of polymers" between the riser and the downcomer.

In the downcomer, high polymeric density values are reached, which approach the bulk density of the polymer. Consequently, a positive gain in pressure can be obtained along the direction of flow so that it becomes possible to reintroduce the polymer into the riser without special, additional mechanical means. In this way, a "loop" circulation is established, which is defined by the balance of pressures between the two polymerization zones and by the head loss introduced into the system.

In some embodiments, the condition of fast fluidization in the riser is established by feeding a gas mixture comprising monomers to the riser. In certain embodiments, the feeding of the gas mixture may be manipulated below the point of reintroduction of the polymer into the riser by the use of a gas distributor. In additional embodiments, the velocity of the transport gas introduced into the riser is higher than the transport velocity under the operating conditions, such as from about 2-15 m/s.

In some embodiments, the polymer and the gaseous mixture leaving the riser are conveyed to a solid/gas separation zone. The solid/gas separation can be manipulated using conventional separation means. From the separation zone, the polymer enters the downcomer. The gaseous mixture leaving the separation zone may then be compressed, cooled and transferred, if appropriate with the addition of make-up monomers and/or molecular weight regulators, to the riser. In certain embodiments, the transfer can be effected by the use of a recycle line for the gaseous mixture.

The control of the polymer circulating between the two polymerization zones can be effected by metering the amount of polymer leaving the downcomer using means for controlling the flow of solids such as mechanical valves.

In some embodiments, the operating temperature is between about 50-120° C.

In certain embodiments, the first stage process can be carried out under operating pressures of between about 0.5-10 MPa, including between about 1.5-6 MPa.

In additional embodiments, one or more inert gases are maintained in the polymerization zone(s) in such quantities that the sum of the partial pressure of the inert gases is between about 5-80% of the total pressure of the gases. The inert gas may be nitrogen or propane, for example.

The various catalysts may be fed up into the riser and downcomer at any point. The catalyst can be in any physical state, thus solid or liquid state catalysts can be used.

The following examples are given to illustrate certain non-limiting embodiments of the present disclosure.

EXAMPLES

Characterization Methods

Melting temperature and crystallization temperature: Determined by differential scanning calorimetry (DSC). A 6±1 mg sample is weighed and heated to 220±1° C. at a rate of 20° C./min and kept at 220±1° C. for 2 minutes in nitrogen stream and it is thereafter cooled at a rate of 20° C./min to 40±2° C., and kept at this temperature for about 2 min to crystallize the sample. The sample is fused at a temperature rise rate of 20° C./min up to 220° C.±1. The melting scan is recorded, a thermogram is obtained, and melting and crystallization temperatures are determined.

Melt Flow Rate (MFR): Determined according to the ISO 1133 (230° C., 5 or 2.16 kg) method.

Solubility in xylene at 25° C. (XS): Determined as follows:

2.5 g of polymer and 250 ml of xylene are introduced in a glass flask equipped with a refrigerator and a magnetic stirrer. The temperature is raised over a 30 minute period to the boiling point of the solvent. The resulting clear solution is then kept under reflux and stirring for 30 minutes. The closed flask is then kept for 30 minutes in a bath of ice and water and in thermostatic water bath at 25° C. for an additional 30 minutes. The resulting solid is filtered on quick filtering paper. 100 ml of the filtered liquid is poured in a previously weighed aluminum container, which is heated on a heating plate under a nitrogen flow to remove the solvent by evaporation. The container is then kept on an oven at 80° C. under vacuum until a constant weight is obtained. The weight percentage of polymer soluble in xylene at room temperature is then calculated.

Ethylene Content of the Polymers ($C_2$ Content)

Ethylene content was determined by infrared (IR) spectroscopy. A pressed film sample was prepared according to ASTM D5576-00 (2013). The spectrum of the polymeric pressed film was recorded as a function of absorbance vs. wavenumbers ($cm^{-1}$). The following measurements are used to calculate $C_2$ content:

a) Area (At) of the combination absorption bands between 4482-3950 $cm^{-1}$, which is used for spectrometric normalization of film thickness.

b) Area (AC2) of the absorption band due to methylenic sequences ($CH_2$ rocking vibration) after a proper digital subtraction of an isotactic polypropylene (IPP) reference spectrum. The range was 660-790 $cm^{-1}$.

Elongation at yield: Measured according to ISO 527.
Elongation at break: Measured according to ISO 527
Stress at break: Measured according to ISO 527.
IZOD Impact Strength
Determined according to ISO 18011A
Samples for Mechanical Analysis
Samples were produced according to ISO 294-2.
Flexural Modulus
Determined according to ISO 178.
Tensile Modulus
Determined according to ISO 527.
Samples for Mechanical Analysis
Samples have been obtained according to ISO 1873-2: 2007, except for the flexural modulus, for which ISO 3167 has been used.

Polydispersity Index (PI): Determined at a temperature of 200° C. by using a parallel plates rheometer (RHEOMETRICS RMS-800 (USA)) operating at an increasing oscillation frequency from 0.1-100 rad/sec. From the crossover modulus the P.I. can be determined using the equation:

P.I.=105/$Gc$ in which Gc is the crossover modulus which is defined as the value (expressed in Pa) at which G'=G", wherein G' is the storage modulus and G" is the loss modulus.

Component A)

Preparation of the Solid Catalyst Component for Component A):

Into a 2000 mL five-necked glass reactor, equipped with mechanical stirrer, jacket and a thermocouple, purged with nitrogen, 1000 mL of $TiCl_4$ were introduced and the reactor was cooled at −5° C. While stirring, 60.0 g of microspheroidal $MgCl_2 \cdot 1.7C_2H_5OH$ having an average particle size of 58 μm (prepared in accordance with the method described in Example 1 of EP Pat. No. EP728769) was added at −5° C. The temperature was raised to 40° C. and an amount of diethyl 2,3-diisopropylsuccinate was added to produce a Mg/succinate molar ratio of 13. The temperature was raised to 100° C. and kept at this value for 60 min. The stirring was stopped for 15 min and the solid was allowed to settled. The liquid was siphoned off. After siphoning, fresh $TiCl_4$ and an amount of 9,9-bis(methoxymethyl)fluorene such to have a Mg/diether molar ratio of 26 was added. Then the temperature was raised to 110° C. and kept for 30 minutes under stirring. The reactor was then cooled to 75° C. and the stirrer was stopped for 15 min. After sedimentation and siphoning, fresh $TiCl_4$ was added. The temperature was raised to 90° C. and the suspension was stirred for 15 min. The temperature was then decreased to 75° C. and the stirrer was stopped for 15 min. After sedimentation and siphoning the solid was washed six times with anhydrous hexane (6×1000 ml) at 60° C. and one time with hexane at 25° C. The solid was dried in a rotavapor.

Preparation of the Catalyst System for Examples 1-2 and Comparative Example 3

Before introducing it into the polymerization reactors, the solid catalyst component described above was contacted with triethyl aluminum (TEAL) and dicyclopentyl dimethoxysilane (DCPMS) at a temperature of 15° C.

Prepolymerization

The catalyst system was then subjected to prepolymerization treatment at 20° C. by maintaining it in a liquid propylene suspension for a residence time of 9 minutes before introducing it into the polymerization reactor.

The polymerization runs were conducted in continuous mode in a polymerization apparatus as described in European Pat. App. EP 1012195.

The catalyst is sent to the polymerization apparatus that comprises two interconnected cylindrical reactors, a riser and a downcomer. Fast fluidization conditions are established in the riser by recycling gas from the gas-solid separator. Hydrogen was used as a molecular weight regulator. The polymerization conditions are reported in Table 1.

TABLE 1

| Component A) | | |
| --- | --- | --- |
| TEAL/external donor | wt/wt | 6 |
| TEAL/catalyst | wt/wt | 6 |
| Temperature | ° C. | 73 |
| Pressure | bar-g | 27 |
| Split holdup | | |
| riser | wt % | 40 |
| downcomer | wt % | 60 |
| $C_3^-$ riser | mole% | 80 |
|  | mole% | 1.3 |
| $H_2/C_3^-$ riser | mol/mol | 0.028 |
| $H_2/C_3^-$ downcomer | mol/mol | 0.016 |

$C_3^-$ = propylene

The properties of component A are reported in Table 2.

TABLE 2

| Component A | | |
| --- | --- | --- |
| MFR 5 kg/230° C. | g/10 min | 1.3 |
| Polydispersity (PI) | | 6.2 |
| Xylene solubles at 25° C. | % | 2.7 |
| ISO Characterization after 7 days | | |
| Flexural modulus | MPa | 2050 |
| Tensile modulus | MPa | 1960 |
| IZOD 0° C. | kJ/m² | 4.3 |
| Stress at yield | % | 36 |
| Elongation at break | kJ/m₂ | 28 |
| Tm | ° C. | 164 |

Component B)

Components B) is a commercial heterophasic polymer obtained by sequential gas phase polymerization. The features of the polymer are reported in Table 3.

TABLE 3

| Component B | | |
|---|---|---|
| Component b1 | | |
| Split | % wt | 30 |
| MFR 2.16 kg/230° C. | g/10 min | 85 |
| Xylene solubles at 25° C. | % wt | 2.0 |
| Component b2 | | |
| Split | % wt | 70 |
| C$_2$ | % wt | 38.5 |
| intrinsic viscosity of the xylene soluble fraction at 25° C. of the whole polymer | wt % | 2.7 |

*C2 = ethylene derived units

Components A and B were blended at various percentages. The properties of the resulting blends are reported in Table 5 and may be compared with the properties of Comparative Example 2.

TABLE 4

| Blend | | 1 | 2 | Comp. Ex. 3 |
|---|---|---|---|---|
| Component | | B | B | — |
| Split* | wt % | 2 | 4 | 0 |
| MFR 5 kg/230° C. | g/10 min | 1.2 | 1.5 | 1.3 |
| IZOD at 0° C. | kJ/m$^2$ | 5.5 | 8 | 4.3 |
| IZOD at −20° C. | kJ/m$^2$ | 3.5 | 4 | 3.1 |
| Flexural modulus | N/mm$^2$ | 2100 | 2050 | 2050 |
| Crystallization temperature | % | 119.3 | 116.1 | 117.4 |
| Melting point | ° C. | 165.1 | 164.6 | 166 |

*The remaining amount comprises component A. Comparative Example 3 is component A alone.

Table 4 shows that the impact properties of the resulting blend are improved while the flexural modulus is substantially unchanged.

What is claimed is:

1. A polyolefin composition comprising:
   A) 90.0-99.0 wt % of a propylene homopolymer comprising:
      (i) a polydispersity index (PI) ranging from 5-10;
      (ii) a xylene soluble content at 25° C. of 1.0-4.0 wt %;
      (iii) a melt flow rate (MFR; ISO 1133; 230° C./5 kg) of 0.2-3.5 g/10 min;
   B) 1.0-10.0 wt %; of a propylene/ethylene copolymer comprising:
      b1) 14-52 wt % of a propylene homopolymer or a propylene/ethylene copolymer having a content of ethylene derived units of 0.1-4.5 wt %; having a xylene soluble content measured at 25° C. of lower than 10 wt %; and a melt flow rate (MFR; ISO 1133; 230° C., 2.16 kg) of 50-120 g/10 min;
      b2) 86 wt % of a propylene ethylene copolymer having a content of ethylene derived units of 20.0-55.0 wt %;
   where the resulting polyolefin composition has a melt flow rate (MFR; ISO 1133, 230° C., 5 kg) of 0.2-4.0 g/10 min; the sum of A+B equals 100% by weight and the sum of b1+b2 equals 100% by weight.

2. The polyolefin composition of claim 1, where component A) is 95-98.5 wt % and component B) is 1.5-5.0. wt %.

3. The polyolefin composition of claim 1, wherein component B) subcomponent b1) is 22-38 wt % and subcomponent b2) is 62-78 wt %.

4. The polyolefin composition of claim 1, where the resulting polyolefin composition has an melt flow rate (MFR; ISO 1133, 230° C., 5 kg) of 0.5-2 g/10 min.

5. The polyolefin composition of claim 1, wherein component B) subcomponent b1) is a propylene homopolymer.

6. The polyolefin composition of claim 1, wherein component B) subcomponent b2) is propylene ethylene copolymer comprising an intrinsic viscosity of the xylene soluble fraction at 25° C. of 1.5-3.9 dl/g.

7. A pipe comprising the polyolefin composition of claim 1.

8. The pipe of claim 6, comprising a sewage pipe.

* * * * *

UNITED STATES PATENT AND TRADEMARK OFFICE
CERTIFICATE OF CORRECTION

| | | |
|---|---|---|
| PATENT NO. | : 10,160,849 B1 | Page 1 of 1 |
| APPLICATION NO. | : 15/514797 | |
| DATED | : December 25, 2018 | |
| INVENTOR(S) | : Cavalieri et al. | |

It is certified that error appears in the above-identified patent and that said Letters Patent is hereby corrected as shown below:

In the Specification

In Column 1, Line 3, after "PROPYLENE-BASED COPOLYMER COMPOSITION FOR PIPES" insert -- This application is the U.S. National Phase of PCT International Application PCT/EP2015/070529, filed September 9, 2015, claiming benefit of priority to European Patent Application No. 14187259.8, filed October 1, 2014, the contents of which are incorporated herein by reference in its entirety. --

In Column 2, Line 34, delete "an" and insert -- a --, therefor

In the Claims

In Column 10, Claim 4, Line 30, delete "an" and insert -- a --, therefor

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*